United States Patent [19]
Tripod

[11] Patent Number: 5,194,784
[45] Date of Patent: Mar. 16, 1993

[54] RASTER CORRECTION CIRCUIT

[75] Inventor: Luc Tripod, Zurich, Switzerland

[73] Assignee: RCA Thomson Licensing Corporation, Princeton, N.J.

[21] Appl. No.: 872,383

[22] Filed: Apr. 23, 1992

[30] Foreign Application Priority Data

Nov. 21, 1991 [GB] United Kingdom ............... 9124745

[51] Int. Cl.$^5$ ............................................. H01J 29/56
[52] U.S. Cl. ........................................ 315/371; 315/408
[58] Field of Search ............................ 315/371, 408

[56] References Cited
U.S. PATENT DOCUMENTS

| | | |
|---|---|---|
| 3,944,879 | 3/1976 | Suzuki . |
| 4,088,931 | 5/1978 | Haferl . |
| 4,140,949 | 2/1979 | Terry . |
| 4,169,988 | 10/1979 | Fecht . |
| 4,182,978 | 1/1980 | Boekhorst . |
| 4,206,388 | 6/1980 | Ishigaki et al. . |
| 4,565,949 | 1/1986 | Haferl . |
| 4,719,392 | 1/1988 | Haferl . |
| 4,823,052 | 4/1989 | Onozawa et al. ............... 315/408 |
| 4,935,675 | 6/1990 | Ochiai ............................... 315/371 |
| 5,043,637 | 8/1991 | Gries et al. ....................... 315/371 |
| 5,059,874 | 10/1991 | Oliver .............................. 315/408 |

Primary Examiner—Theodore M. Blum
Attorney, Agent, or Firm—Joseph S. Tripoli; Joseph J. Laks; Sammy S. Henig

[57] ABSTRACT

In a deflection apparatus which corrects for inside barrel distortion, a horizontal deflection winding and a retrace capacitance form a retrace resonance circuit during a retrace interval. A trace capacitance forms a trace resonant circuit with the deflection winding during the trace interval. A circuit branch, that includes a second capacitance and an inductance, is coupled to the deflection winding, during the trace interval. The circuit branch forms a second resonant circuit with the trace capacitance having a resonance frequency that is higher than a frequency of a deflection current in the deflection winding. A current in the circuit branch, that is modulated in a vertical rate, modulates the deflection current in a manner to reduce inside barrel distortion.

12 Claims, 8 Drawing Sheets

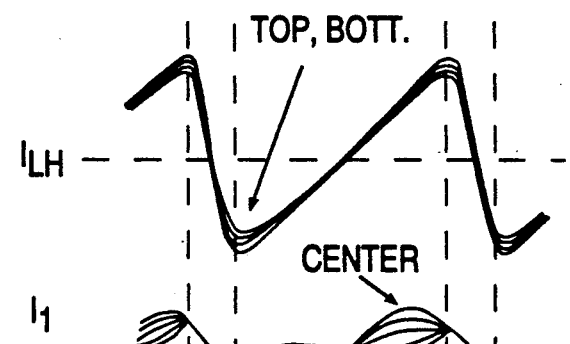
FIG. 2 a)  $I_{LH}$
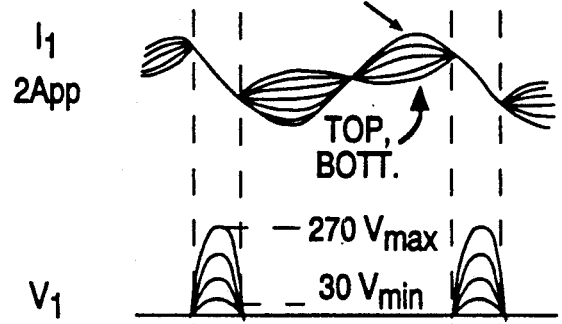
FIG. 2 b)  $I_1$ 2App
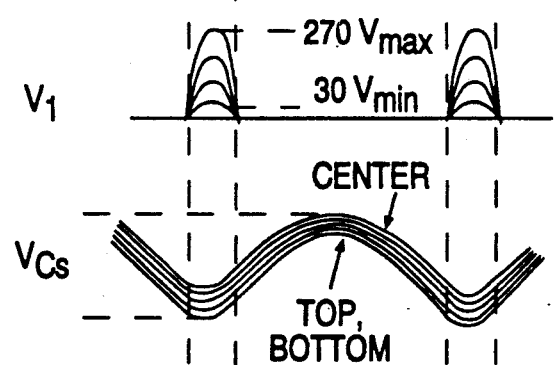
FIG. 2 c)  $V_1$
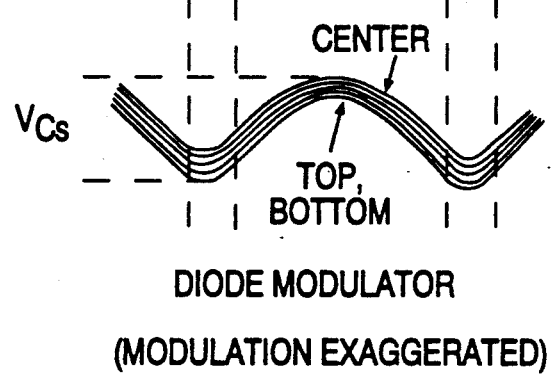
FIG. 2 d)  $V_{Cs}$
DIODE MODULATOR
(MODULATION EXAGGERATED)

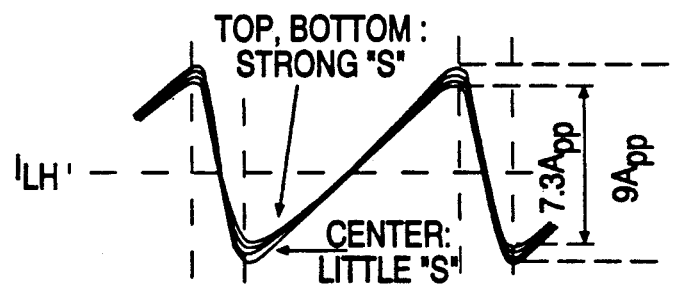
FIG. 4 a) $I_{LH}$'
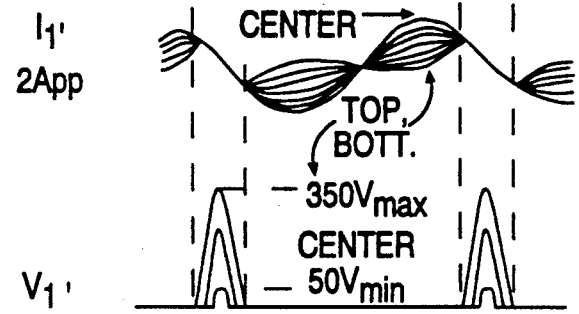
FIG. 4 b) $I_1$' 2App
FIG. 4 c) $V_1$'
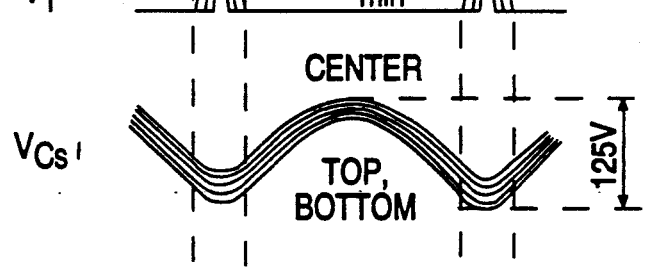
FIG. 4 d) $V_{Cs}$'
SWITCHED E - W
RASTER CORRECTION CIRCUIT
(MODULATION EXAGGERATED)

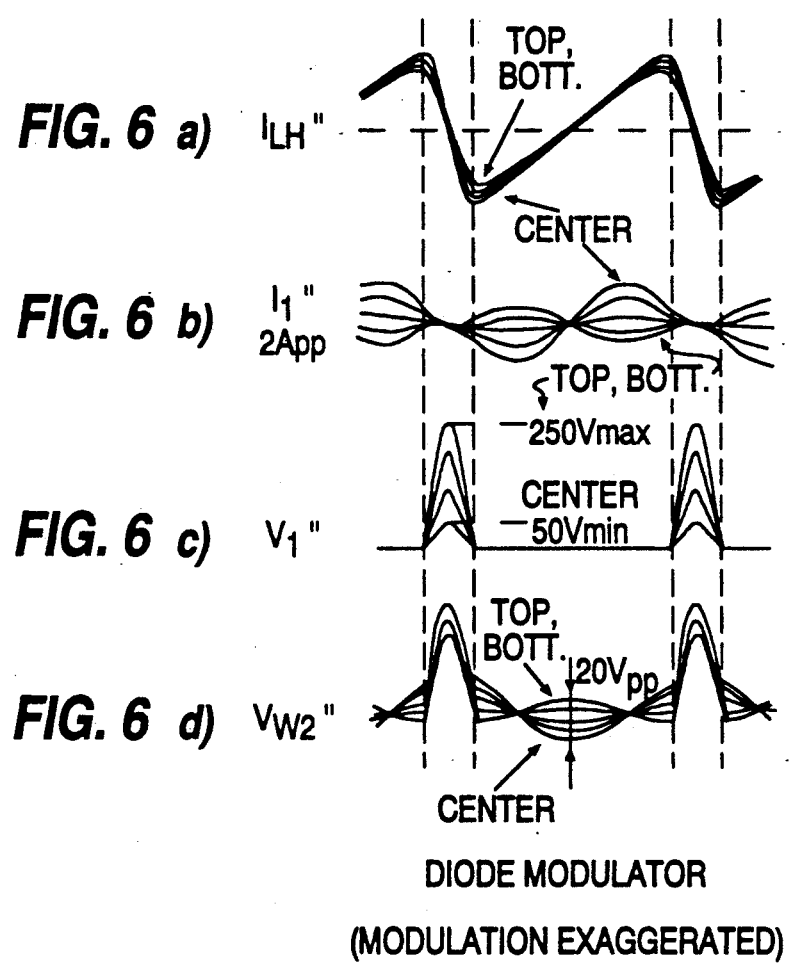

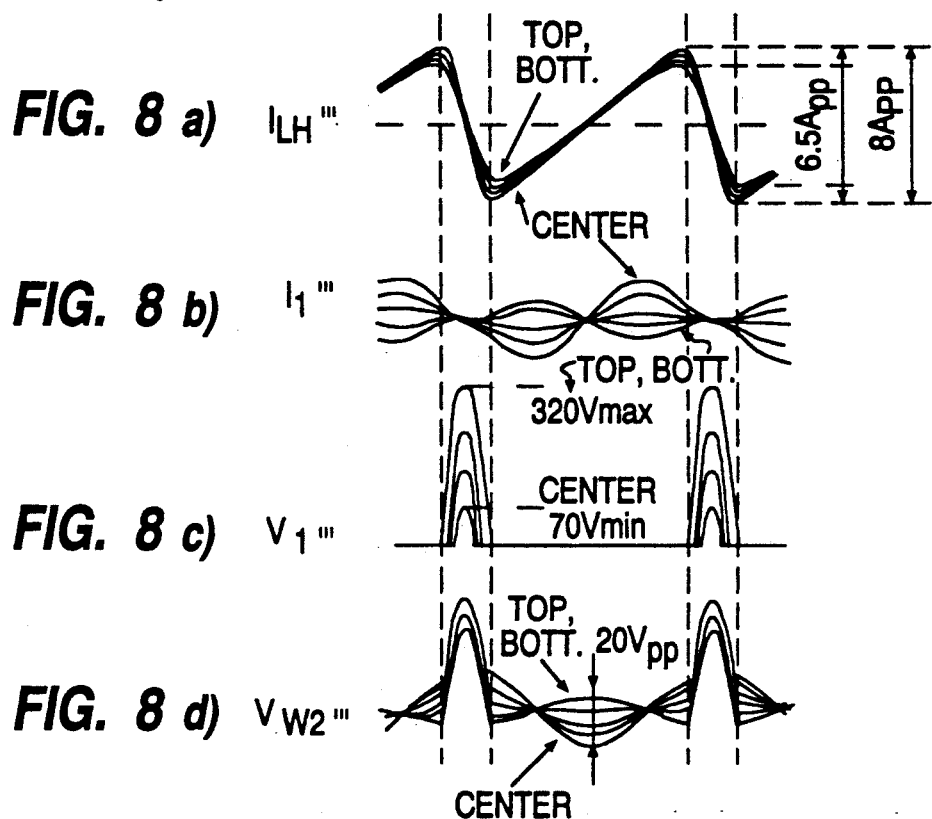

COIL FORMER : VOGT KIT NO. K-5321400000
FERRITE CORE: FERROCARIT FI311
$W_1$ : 190 TURNS ø 0.355mm ENAMEL Cu
$W_2$ : 25 TURNS 20 X 0.15mm LITZ WIRE

INSIDE BARREL DISTORTION

RASTER CORRECTION CIRCUIT

This invention relates to a deflection circuit in which the "S"-shaping of the deflection current may be varied or modulated over a relatively wide range for obtaining inside barrel distortion correction.

Color television picture tubes with large faceplates of reduced curvature, such as, for example, Hitachi A78JVB61X picture tube require a significantly high amount of outside pincushion or East-West (E-W) correction. Such high amount of E-W correction may result in over-correction inside the picture that is referred to as inside barrel distortion.

FIG. 10 illustrates inside barrel distortion as it appears on a television raster displaying a crosshatch line pattern indicated generally by 11. The right and left sides of the crosshatch pattern are defined by vertical lines 12 and 14. Lines 12 and 14 are straight, indicating that the raster is East-West outside pincushion corrected. Vertical grid lines 16 and 18 lying between the center and the sides of the raster are curved, as indicated by their departure from the straight dotted lines, indicating the presence of inside barrel distortions. Horizontal lines 17a and 17b illustrate the horizontal scanning position for a top or a bottom raster scanning example; whereas, horizontal line 19 illustrates the horizontal scanning position for a center raster scanning example.

The correction of the inside barrel distortion requires a modulation of the "S"-shaping of the deflection current during horizontal trace along the vertical scanning axis. It may be desirable to decrease the "S"-shaping from top to the center of the raster and to increase the "S"-shaping from the center to the bottom of the raster to obtain straight vertical lines such as shown by the dotted lines in FIG. 10.

In accordance with an aspect of the invention, a deflection apparatus with inside barrel distortion correction includes a deflection winding for generating scanning current at a deflection rate in the deflection winding during a trace interval and during a retrace interval of a deflection cycle. Switching means coupled to the deflection winding generates the scanning current. A trace capacitance coupled to the deflection winding forms with the deflection winding a first trace resonant circuit during the trace interval such that the scanning current that flows in the trace capacitance develops during the trace interval a parabolic voltage in the trace capacitance. A circuit branch, including a second capacitance and a modulation inductance, that is coupled to the trace capacitance forms with the trace capacitance a second resonant circuit for generating in the modulation inductance a modulation current at an amplitude that is modulated. The modulation current is coupled to the trace capacitance to vary the parabolic voltage in the trace capacitance in accordance with the amplitude of the modulation current in a manner to reduce inside barrel distortion. The trace capacitance acts as a low impedance bypass capacitance for the scanning current around the modulation inductance substantially throughout the retrace interval.

A deflection apparatus, embodying an aspect of the invention, with inside geometry distortion correction includes a deflection winding, a retrace capacitance and a source of an input signal at a frequency that is related to a deflection frequency. A first switching arrangement is coupled to the deflection winding and to the retrace capacitance and is responsive to the input signal for generating a deflection current in the deflection winding at the deflection frequency and a retrace pulse in the retrace capacitance. The retrace pulse is modulated in accordance with a modulation signal. The modulation of the retrace pulse modulates the deflection current in a manner to correct for an outside geometry distortion of a first type. A modulation capacitance is coupled to a modulation inductance to form a first trace resonant circuit, during a trace interval. The first trace resonant circuit is responsive to the modulated retrace pulse for generating a resonant modulation current in the trace resonant circuit that is modulated in accordance with the modulated retrace pulse and that varies in accordance with a resonance frequency of the first trace resonant circuit. The modulation current is coupled to the deflection winding, during the trace interval, to modulate the deflection current in a manner to reduce an inside geometry distortion of a second type that is an opposite geometry distortion type with respect to the first type.

FIGS. 2a-2d illustrate waveforms useful in explaining the operation of the circuit of FIG. 1;

FIGS. 4a-4d illustrate waveforms useful in explaining the operation of the circuit of FIG. 3;

FIGS. 6a-6d illustrate waveforms useful in explaining the operation of the circuit of FIG. 5;

FIGS. 8a-8d illustrate waveforms useful in explaining the operation of the circuit of FIG. 7;

Figure 1:
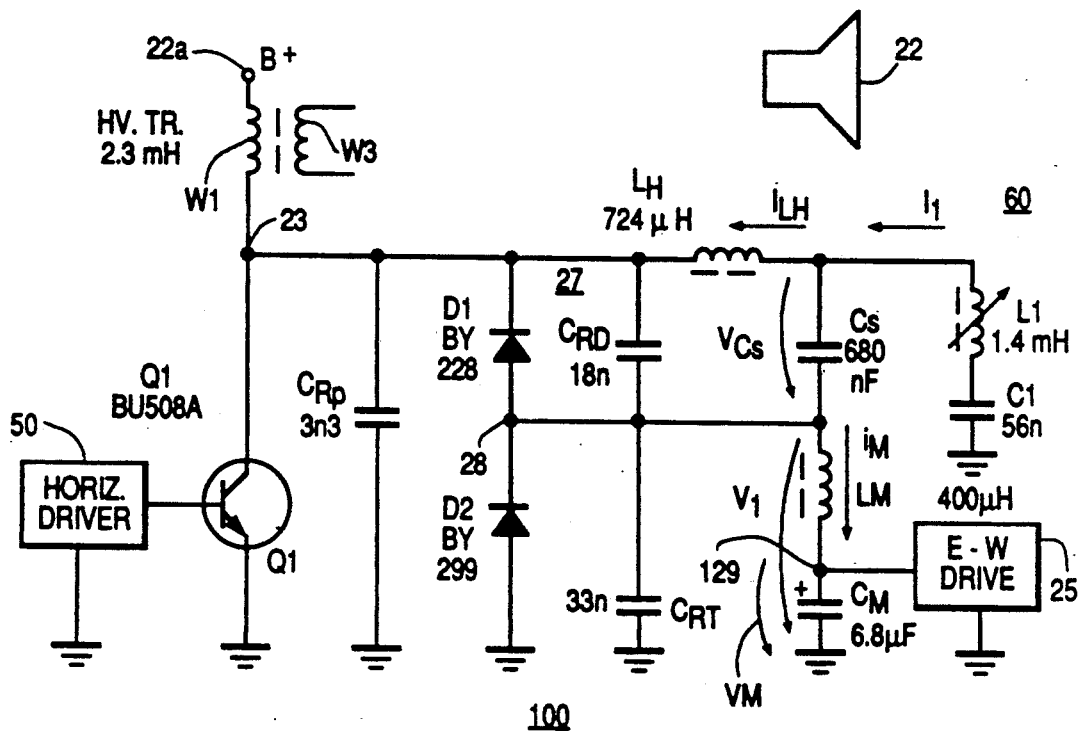
FIG. 1 illustrates a deflection circuit with inside barrel and outside pincushion distortion correction, embodying an aspect of the invention.

A deflection circuit 100 of FIG. 1, embodying an aspect of the invention, may provide horizontal deflection of the electron beams in a, for example, an Hitachi A78JVB61X color picture tube (CRT) 22. CRT 22 has an aspherical faceplate such that the curvature along the horizontal axis is different from the curvature along the vertical axis. In FIG. 1, a source of regulated direct current voltage B+, developed between a terminal 22a and ground, is coupled to a primary winding W1 of a horizontal flyback transformer T1. The other terminal of winding W1 is coupled to a junction terminal 23. Regulated voltage B+ is generated, for example, by a switched mode power supply, not shown. A secondary winding W3 of transformer T1 supplies an ultor voltage in a well known manner, not shown.

A horizontal output transistor Q1, having its base coupled to a conventionally built driver and oscillator circuit 50, has its collector-to-emitter path coupled between junction terminal 23 and ground. Paralleling transistor Q1 is the series arrangement of two rectifiers, diodes D1 and D2. Coupled between the anode and cathode electrodes of diode D1 is an arrangement of a horizontal deflection winding $L_H$ that is coupled to an S-shaping, or a trace capacitance $C_S$. A deflection retrace capacitance $C_{RD}$, coupled also between the anode and cathode electrodes of diode D1, forms with deflection winding $L_H$, a parallel retrace resonant circuit 27. A second retrace capacitance $C_{RT}$ is coupled between a junction terminal 28 and ground. Circuit 100 provides outside pincushion distortion correction similarly to a conventional diode modulator.

Circuit 100 includes a diode modulator coil $L_M$ having one end terminal that is coupled to a terminal 28 between diodes D1 and D2. The other terminal of coil $L_M$ is coupled to a terminal 129. An East-West drive circuit 25 provides East-West or outside pin modulation voltage VM at the vertical rate at terminal 129. A modulator trace capacitor $C_M$ is coupled between terminal 129 and ground. Modulator retrace capacitor $C_{RT}$ and coil $L_M$ form a retrace resonant circuit that resonates during retrace at the deflection retrace frequency that is approximately 44 KHz. Similarly, deflection winding $L_H$ and deflection retrace capacitor $C_{RD}$ form a second retrace resonance circuit. The second retrace resonance circuit resonates during retrace at the deflection retrace frequency as in a conventional diode modulator. Coil or inductor $L_M$, deflection winding $L_H$ and capacitors $C_{RD}$ and $C_{RT}$ form a balanced bridge circuit such that the ratio of the inductance of deflection winding $L_H$ to that of inductor $L_M$ is substantially that of the ratio of capacitor $C_{RT}$ and $C_{RD}$.

Because the aforementioned Hitachi color picture tube has a large faceplate of reduced curvature, the required extent of outside pincushion distortion correction is significant. Correcting for the outside pincushion distortion in such tube results in over-compensation inside the picture. Such over-compensation produces inside barrel distortion.

An inside barrel correction circuit 60, embodying an aspect of the invention, reduces the inside barrel distortion that is caused by the aforementioned over-compensation. Circuit 60 includes the series arrangement of a capacitor C1 and an inductor L1 coupled to deflection trace capacitor $C_S$. FIGS. 2a–2d illustrate waveforms useful in explaining the operation of deflection circuit 100 of FIG. 1. Similar numbers and symbols in FIGS. 1 and 2a–2d indicate similar items or functions.

Circuit 60 that forms a series resonant circuit has a resonant frequency $f_0$ of about 18 KHz. In comparison, a horizontal frequency $f_H$ of a horizontal deflection current $i_{LH}$ in winding $L_H$ is 15,625 KHz. A parabolic voltage $V_{CS}$ of FIG. 2d in capacitor $C_S$ of FIG. 1 generates a current $I_1$ of FIG. 2b in inductor L1 of FIG. 1 and in capacitor C1 having a sinusoidal component. Current $I_1$ modulates the S-correction of deflection current $i_{LH}$ of FIG. 2a in winding $L_H$ of FIG. 1 in a manner to provide for inside barrel distortion correction.

Figure 11:
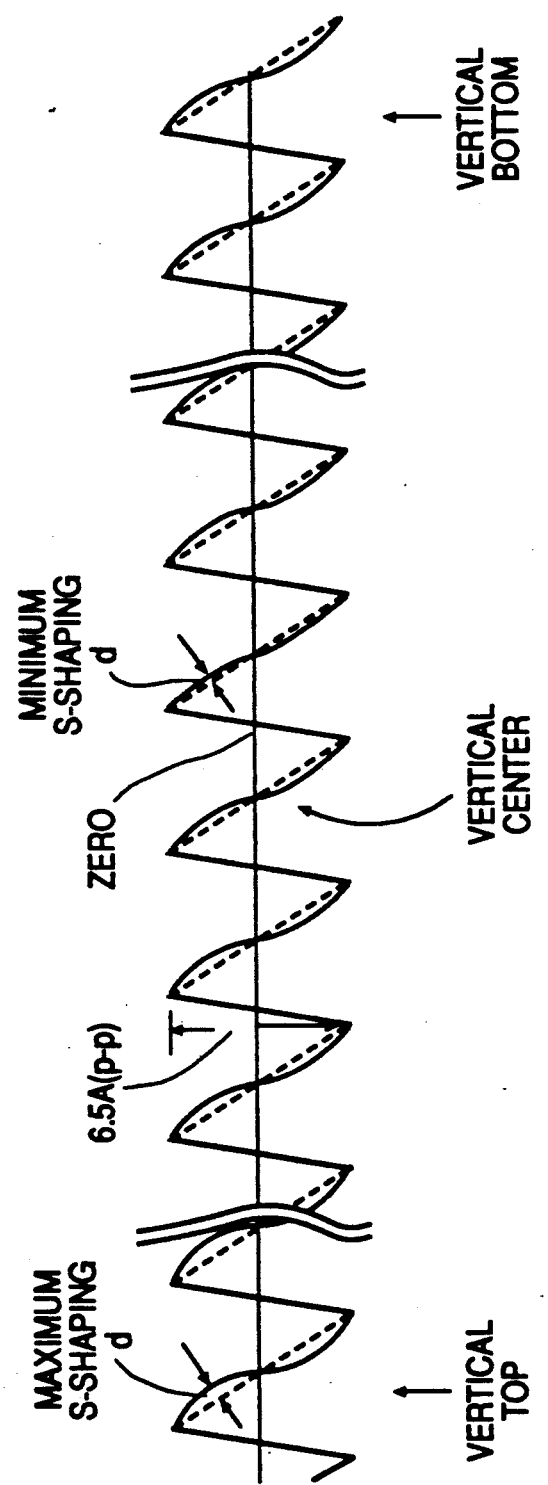
FIG. 11 illustrates a waveform of a deflection current of the circuit of FIG. 1 that provides for inside barrel geometry distortion.

FIG. 11 illustrates the way S-shaping of current $i_{LH}$ of FIGS. 1 and 11 varies during a vertical period. At the vertical center, a parameter "d" representing the extent of the S-shaping, is at a minimum; on the other hand, at the vertical top/bottom, it is at a maximum.

Pincushion and barrel distortions are opposite type distortions. Thus, to provide, for example, inside barrel distortion correction, the S-shaping of deflection current $i_{LH}$ is at a minimum at the vertical center of the display screen. In contrast, to provide inside pincushion distortion correction, the S-shaping of deflection current $i_{LH}$ is at a maximum at the vertical center.

During retrace, a retrace pulse voltage $V_1$ of FIG. 1 developed at terminal 28 is coupled to capacitor C1 and inductor L1 via capacitor $C_S$. Pulse voltage $V_1$ of FIG. 2c is at opposite phase to voltage $V_{CS}$ of FIG. 2d. Therefore, pulse voltage $V_1$ of FIG. 1 decreases current $I_1$. The larger is the amplitude of voltage $V_1$, the greater is the extent of the decrease in current $I_1$. Pulse voltage $V_1$ is modulated in a vertical rate parabolic manner to provide for outside pincushion distortion correction. Consequently, currents $I_1$ and $i_{LH}$ are also modulated in a vertical rate parabolic manner.

The smaller is the impedance of circuit 60, the larger is current $I_1$ and, therefore, the greater is the extent of inside barrel distortion correction. For the aforementioned picture tube, about twice the value of the inductance of winding $L_H$ is desirable for the value of inductor L1. The value of capacitor C1 is then defined by the desired resonant frequency $f_0$ of about 18 KHz.

The extent of inside barrel correction can be adjusted by varying the resonant frequency $f_0$ using variable inductor L1. Adjusting the resonant frequency $f_0$ closer towards horizontal frequency $f_H$ causes the current $I_1$ to increase and therefore the extent of the modulation of the S-correction increases. Inductor L1 and capacitor C1 are coupled in parallel with capacitor $C_{RT}$, during retrace. Therefore, to obtain a correct retrace interval, the value of capacitor $C_{RT}$ is made larger than if inductor L1 and capacitor C1 were not included.

Figure 3:
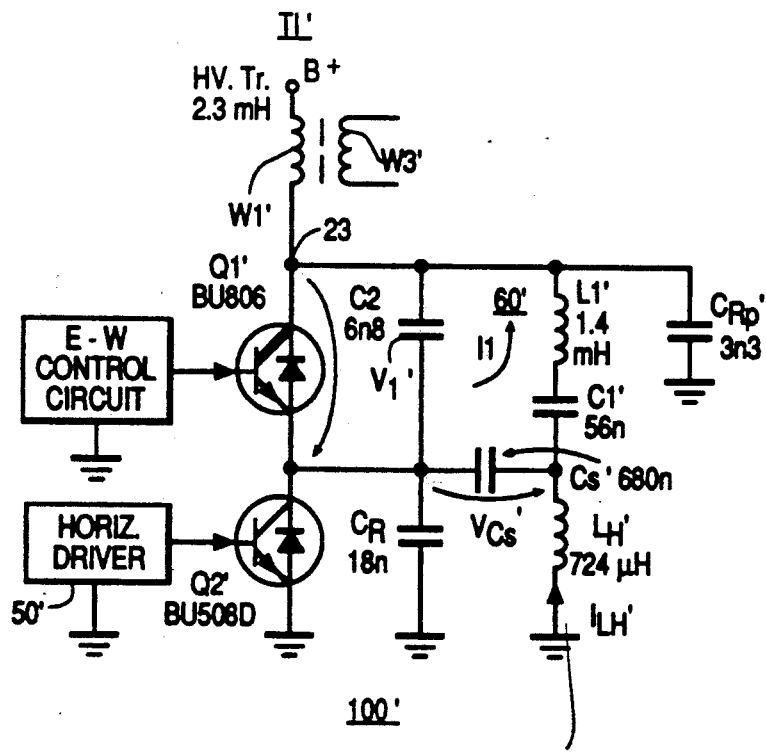
FIG. 3 illustrates a deflection circuit with inside barrel and outside pincushion distortion correction embodying another aspect of the invention.

FIG. 3 illustrates a deflection circuit 100', embodying another aspect of the invention, that also provides both outside pincushion and inside barrel correction. FIGS. 4a–4d illustrate waveforms associated with the circuit of FIG. 3. Similar symbols and numerals in FIGS. 3 and 4a–4d indicate similar items or functions.

An inside barrel distortion correction circuit 60' of FIG. 3 includes a coil L1' that may be variable for adjustment purposes, a capacitor C1' and a retrace capacitor C2. Series coupled coil L1' and capacitor C1' form an arrangement that is coupled in parallel with a trace capacitor $C_S'$, during the trace interval, via a transistor Q1'. Coil L1', capacitor $C_S'$ and capacitor C1' form a trace resonant circuit that is tuned to, for example, 18 KHz, that is higher than frequency $f_H$.

A transistor Q2' that is coupled in series with transistor Q1' is turned off to initiate a retrace interval. Transistor Q1' is turned off during the retrace interval at a controllable instant that is modulated at a vertical rate parabolic manner. Capacitor C2 provides a current path for current $I_1'$, during retrace. Capacitor C2 and inductor L1' form a resonant circuit that is tuned to provide the required length of the retrace interval. Outside pincushion distortion correction is obtained in a manner explained in detail in U.S. patent application Ser. No. 722,809, in the name of P. E. Haferl, entitled RASTER DISTORTION CORRECTION CIRCUIT, that is incorporated by reference herein. Inside barrel distortion correction is obtained similarly to that in FIG. 1.

Figure 5:
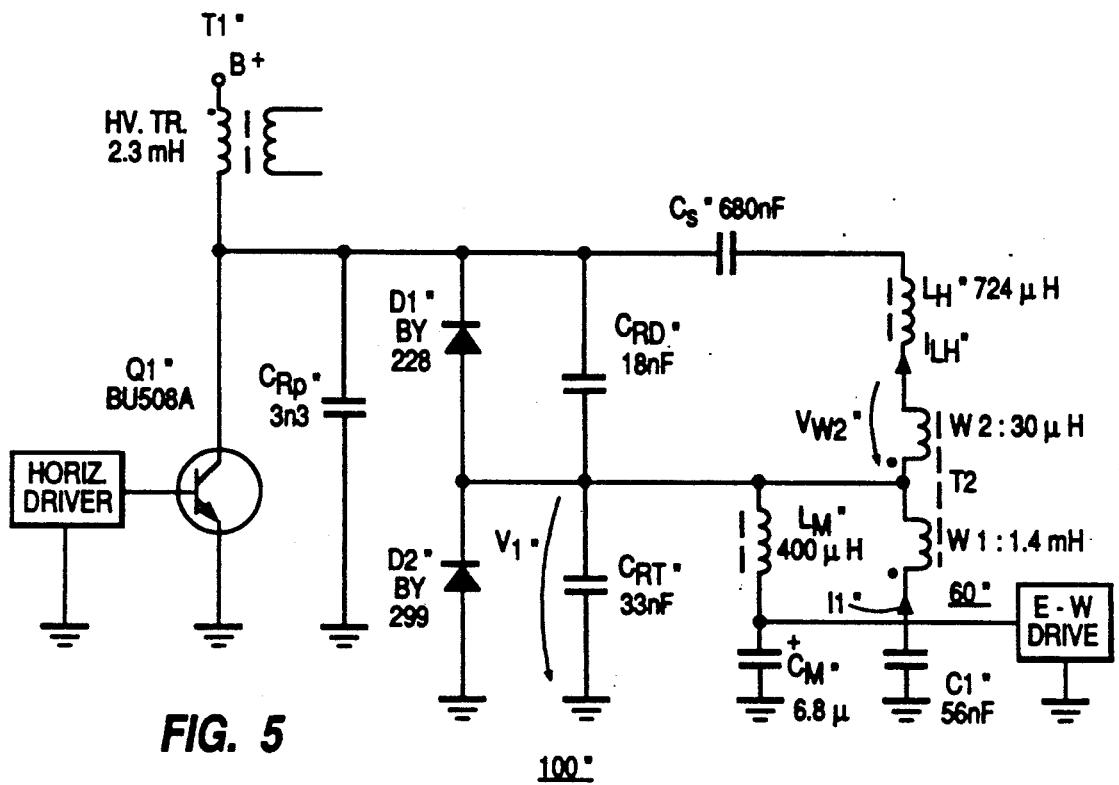
FIG. 5 illustrates a deflection circuit with inside barrel and outside pincushion distortion correction embodying a further aspect of the invention.

FIG. 5 illustrates a deflection circuit 100'', embodying a further aspect of the invention that also provides both outside pincushion and inside barrel distortion correction. Outside pincushion distortion correction is obtained similarly to that in the arrangement of FIG. 1. FIGS. 6a–6d illustrate waveforms associated with the circuit of FIG. 5. Similar symbols and numerals in FIGS. 1, 5 and 6a–6d indicate similar items or functions.

The arrangement of FIG. 5 includes a winding W1 of an auto-transformer T2 in series with a capacitor C1". Winding W1 and capacitor C1" form, during trace, a resonant circuit 60" with a resonance frequency of about 18 KHz in a manner similar to that in FIG. 1. A winding W2 of a transformer T2 is coupled in series with a horizontal deflection winding $L_H$". The amplitude of a resonant current $I_1$" is controlled by a retrace pulse voltage $V_1$" that is developed across a retrace capacitor $C_{RT}$". Capacitor $C_{RT}$" is coupled across circuit 60", during retrace. Pulse voltage $V_1$" is modulated in a vertical rate parabolic manner. Modulated current $I_1$" is transformer-coupled to winding W2 to provide for inside barrel distortion correction.

Figure 9:
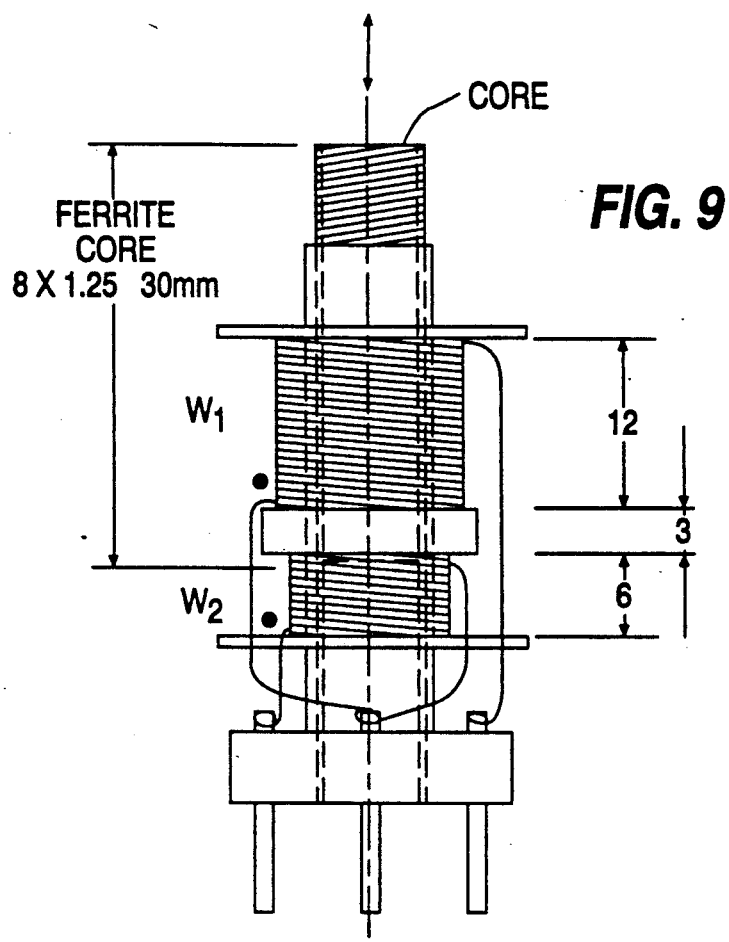
FIG. 9 illustrates the way an auto-transformer of the circuit of FIG. 5 or 7 is constructed.
Figure 10:
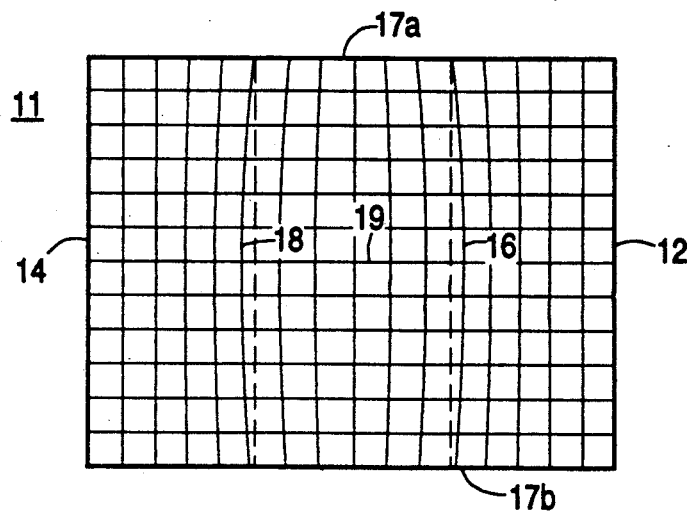
FIG. 10 illustrates a crosshatch pattern in which inside barrel distortion is uncorrected.

Auto-transformer T2 is constructed in a manner shown in FIG. 9. Displacing a core CORE in a direction away from winding W1 and into winding W2 varies the coupling between windings W1 and W2 without affecting the inductance of winding W1. In this way, advantageously, the extent of the inside barrel distortion correction can be adjusted. A tight coupling between windings W1 and W2 results in a large amount of correction; conversely, a loose coupling results in a small amount of correction.

Advantageously, the amount of barrel distortion correction is adjustable by using transformer T2. Thereby, the coupling between resonant circuit 60" and deflection current $I_{LH}$" varies. The inductance of winding W1, and thus the resonant frequency of circuit 60", remains constant when core CORE is displaced. Advantageously, any risk of uncontrollably high currents in resonant circuit 60" is thereby reduced. To provide inside barrel distortion correction, circuit 100" is less dependent on the particular way inductance $L_H$" and trace capacitor $C_S$" are coupled to each other. This is so because the modulation of the deflection current takes place, advantageously, mainly via winding W2 and less by the operation of capacitor $C_S$". Thus, in the arrangement of FIG. 5, unlike in the arrangement of FIG. 1 or 3, the effect of the parabolic voltage across the trace capacitor is less significant for inside barrel distortion correction purposes.

Figure 7:
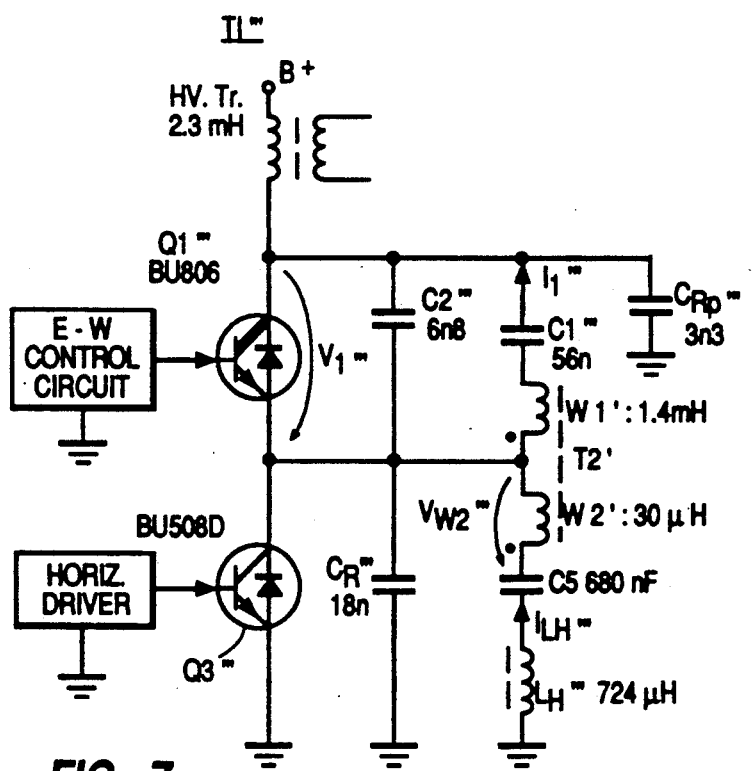
FIG. 7 illustrates a deflection circuit with inside barrel and outside pincushion distortion correction embodying an additional aspect of the invention.

FIG. 7 illustrates a deflection circuit 100''', embodying an additional aspect of the invention, that also provides both outside pincushion and inside barrel distortion correction. Outside pincushion distortion correction is obtained in a manner similar to that in FIG. 3. FIGS. 8a–8d illustrate associated waveforms. Similar symbols and numerals in FIGS. 3, 7 and 8a–8d indicate similar items or functions. Inside barrel distortion correction is obtained in circuit 100''' of FIG. 7 in a way similar to that described with respect to FIG. 5. In the arrangement of FIG. 7, unlike in the arrangement of FIG. 1 or 3, the parabolic voltage across the trace capacitor is less significant for inside barrel distortion correction purposes. This is so because a winding W2' of a transformer T2' provides the required modulation for inside barrel distortion correction purposes.

What is claimed is:

1. A deflection apparatus with inside geometry distortion correction, comprising:
   a deflection winding;
   a retrace capacitance;
   a source of an input signal at a frequency that is related to a deflection frequency;
   first switching means coupled to said deflection winding and to said retrace capacitance and responsive to said input signal for generating a deflection current in said deflection winding at said deflection frequency and a retrace pulse in said retrace capacitance;
   a source of a modulation signal at a frequency that is related to a second deflection frequency;
   means responsive to said modulation and input signals and coupled to said deflection winding and to said retrace capacitance for modulating, in accordance with said modulation signal, said retrace pulse, the modulation of said retrace pulse modulating said deflection current in a manner to correct for an outside geometry distortion of a first type; and
   a modulation capacitance coupled to a modulation inductance to form a first trace resonant circuit, during a trace interval, said first trace resonant circuit being responsive to said modulated retrace pulse for generating a resonant modulation current in said trace resonant circuit that is modulated in accordance with said modulated retrace pulse and that varies in accordance with a resonance frequency of said first trace resonant circuit, said modulation current being coupled to said deflection winding, during said trace interval, to modulate said deflection current in a manner to reduce an inside geometry distortion of a second type that is an opposite geometry distortion type with respect to said first type.

2. An apparatus according to claim 1 further comprising, a trace capacitance that is coupled to said deflection winding to form a second trace resonant circuit, during said trace interval, wherein said modulation current modulates a parabolic voltage that is developed in said trace capacitance in a manner to reduce said inside barrel geometry distortion.

3. An apparatus according to claim 1 wherein said first trace resonant circuit has a resonance frequency that is higher than said deflection frequency.

4. A deflection apparatus according to claim 2 wherein said first trace resonant circuit is coupled in parallel with said trace capacitance, during said trace interval.

5. An apparatus according to claim 2 wherein said deflection winding is coupled in parallel with said first trace resonant circuit and in parallel with said trace capacitance, during said trace interval.

6. An apparatus according to claim 1 wherein said modulation inductance is coupled in series with said modulation capacitance.

7. An apparatus according to claim 1 wherein said outside geometry distortion is of said outside pincushion type and said inside geometry distortion is of said barrel type.

8. An apparatus according to claim 1 wherein said modulation current is coupled to said deflection winding via a transformer.

9. An apparatus according to claim 1 wherein said modulated retrace pulse is a retrace pulse voltage that is amplitude-modulated.

10. An apparatus according to claim 1 wherein said outside geometry distortion correcting means comprises a diode modulator.

11. A deflection apparatus with inside geometry distortion correction, comprising:
    a horizontal deflection winding mounted on a neck of a cathode ray tube;
    a source of an input signal at a frequency that is related to a horizontal deflection frequency;

first switching means coupled to said deflection winding and responsive to said input signal for generating a horizontal deflection current in said deflection winding at said horizontal deflection frequency;

a source of a modulation signal at a frequency that is related to a vertical deflection frequency; and means responsive to said modulation and input signals and coupled to said deflection winding for modulating said deflection current, in accordance with said modulation signal, in a manner to correct for an inside barrel distortion such that S-shaping of said horizontal deflection current is smaller at a vertical center than at one of a vertical top and a vertical bottom of a display screen of said cathode ray tube.

12. A deflection apparatus with inside geometry distortion correction, comprising:

a deflection winding;

a retrace capacitance;

a source of an input signal at a frequency that is related to a deflection frequency;

first switching means coupled to said deflection winding and to said retrace capacitance and responsive to said input signal for generating a deflection current in said deflection winding at said deflection frequency and a retrace pulse in said retrace capacitance;

a source of a modulation signal at a frequency that is related to a second deflection frequency;

means responsive to said modulation and input signals and coupled to said deflection winding and to said retrace capacitance for modulating, in accordance with said modulation signal, said retrace pulse, the modulation of said retrace pulse modulating said deflection current in a manner to correct for an outside geometry distortion;

a transformer that includes an adjustable core; and a modulation capacitance coupled to a modulation inductance to form a first trace resonant circuit, during a trace interval, said first trace resonant circuit being responsive to said modulated retrace pulse for generating a resonant modulation current in said trace resonant circuit that is modulated in accordance with said modulated retrace pulse and that varies in accordance with a resonance frequency of said first trace resonant circuit, said modulation current being coupled to said deflection winding via said transformer, during said trace interval, to modulate said deflection current in a manner to reduce an inside geometry distortion such that an adjustment of said core adjusts an S-shaping of said deflection current without significantly changing a resonance frequency of said first trace resonant circuit.

* * * * *